Figure 1:
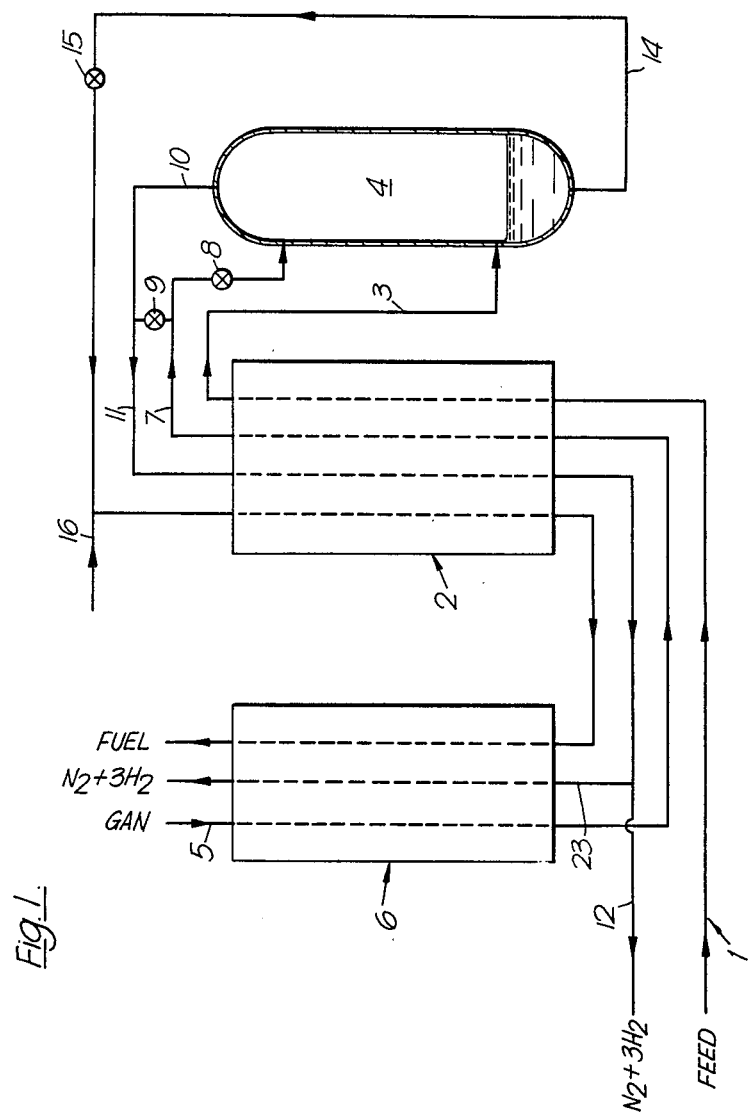

United States Patent [19]

McNeil

[11] 4,239,647

[45] Dec. 16, 1980

[54] METHOD AND APPARATUS FOR MANUFACTURING AMMONIA SYNTHESIS GAS FROM A STREAM OF GAS RICH IN HYDROGEN AND A STREAM OF NITROGEN

[75] Inventor: Brian A. McNeil, Chessington, United Kingdom

[73] Assignee: Air Products and Chemicals, Inc., Allentown, Pa.

[21] Appl. No.: 115,302

[22] Filed: Jan. 25, 1980

[30] Foreign Application Priority Data

Mar. 8, 1979 [GB] United Kingdom ............... 08136/79
Nov. 2, 1979 [GB] United Kingdom ............... 38046/79

[51] Int. Cl.$^3$ ........................... C01B 2/02; F25J 3/00
[52] U.S. Cl. ........................................ 252/377; 62/17
[58] Field of Search ............................ 252/377; 62/17

[56] References Cited

U.S. PATENT DOCUMENTS

| | | | |
|---|---|---|---|
| 3,372,555 | 3/1968 | Becker | 252/377 |
| 3,649,558 | 3/1972 | Linde et al. | 252/377 |
| 3,654,769 | 4/1972 | Linde | 252/377 |

*Primary Examiner*—A. Siegel
*Attorney, Agent, or Firm*—James C. Simmons; E. Eugene Innis

[57] ABSTRACT

Difficulties associated with the operational stability of a conventional cryogenic plant for manufacturing ammonia synthesis gas from a stream rich in hydrogen and a stream of nitrogen are reduced by using three heat exchangers in place of the conventional single heat exchanger. In use, the first heat exchanger, which is preferably arranged with its cold end uppermost, is used to cool the stream of nitrogen to a temperature which:

(a) if the nitrogen is above its critical pressure is between 8° and 28° C. above its critical temperature; or (b) if the nitrogen is below its critical pressure is between 3° and 9° C. above its dew point.

Part of the nitrogen leaving the first heat exchanger is passed downwardly through a third heat exchanger where it is further cooled before being introduced into a nitrogen wash column where it acts as reflux. The third heat exchanger is cooled by vapor leaving the top of the nitrogen wash column.

After being cooled in the first heat exchanger the stream rich in hydrogen is passed upwardly in a second heat exchanger where it is further cooled before being introduced into the lower portion of the nitrogen wash column. This further cooling is achieved by:

(i) the balance of the vapor leaving the top of the nitrogen wash column; and (ii) vaporizing the two phase mixture formed by expanding the liquid in the bottom of the nitrogen wash column; and (iii) adding external refrigeration if necessary.

The overall layout has the advantage that the stream of nitrogen is passing downwardly in the third heat exchanger which operates in the temperature range where the density of the nitrogen increases rapidly as its temperature falls. In addition the largely liquid two phase mixture from the bottom of the nitrogen wash column vaporizes as it passes downwardly through the second heat exchanger thereby reducing the problems associated with slug flow.

Although three heat exchangers are used the overall capital cost of the installation is comparable with a conventional installation. This is because certain phase separators and distributors can be omitted.

A modification is also described which facilitates recovery of most of the small amount of hydrogen in the liquid leaving the bottom of the nitrogen wash column.

4 Claims, 2 Drawing Figures

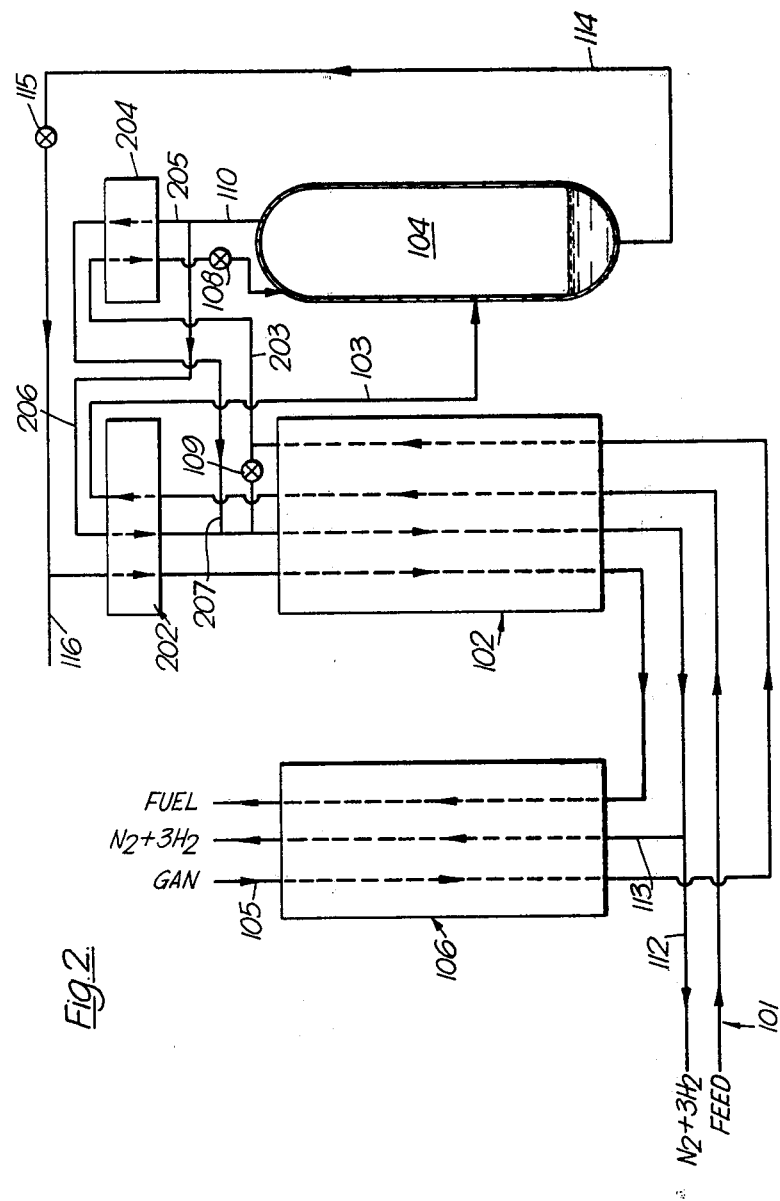

METHOD AND APPARATUS FOR MANUFACTURING AMMONIA SYNTHESIS GAS FROM A STREAM OF GAS RICH IN HYDROGEN AND A STREAM OF NITROGEN

DESCRIPTION OF INVENTION

This invention relates to a method and an apparatus for manufacturing ammonia synthesis gas from a stream rich in hydrogen and a stream of nitrogen.

FIG. 1 of the accompanying drawings shows a simplified layout of a known apparatus for manufacturing ammonia synthesis gas from a stream rich in hydrogen and a stream of nitrogen. In particular, a feed stream 1 comprising (by volume):
$H_2$: 96.73%
CO: 2.57
$CH_4$: 0.3
A: 0.27
Others: 0.13
at $-55°$ C. and 48.5 Kg/cm$^2$ absolute is cooled to $-187°$ C. in heat exchanger 2. The gas leaving the heat exchanger 2 is just above its dew point and is fed through pipe 3 into the lower portion of a nitrogen wash column 4.

A stream 5 gaseous nitrogen is cooled to $-187°$ C. in heat exchangers 6 and 2. The nitrogen leaving heat exchanger 2 through pipe 7 is supercritical. The supercritical nitrogen is divided into two streams, one of which is expanded through valve 8 and the other of which is expanded through valve 9.

The supercritical nitrogen passes through control valve 8 and is fed into nitrogen wash column 4 where it liquifies. As the liquid nitrogen passes down the nitrogen wash column 4 it condenses the carbon monoxide, methane and argon from the feed stream which collect in the bottom of the nitrogen wash column 4 together with some nitrogen. The hydrogen, together with most of the nitrogen in the form of vapour leave the top of the nitrogen wash column 4 through pipe 10 where they are mixed with supercritical nitrogen from valve 9. The resulting two phase mixture comprising, by volume, one part nitrogen and three parts hydrogen passes through pipe 11 into heat exchanger 2 (via a two phase separator and distributor—not shown) which it leaves at $-58°$ C. The mixture is then divided into streams 12 and 13. Approximately 75% of the mixture passes along stream 12 whilst the balance is warmed against the incoming gaseous nitrogen in heat exchanger 6.

The liquid leaves the bottom of the nitrogen wash column 4 through pipe 14 and is expanded at valve 15. A small quantity of liquid nitrogen is added to the largely liquid mixture leaving valve 15 and the liquid is introduced into heat exchanger 2 (via a two phase separator and distributor—not shown) and vapourized therein.

The gas is then warmed in heat exchanger 6. The gas leaving heat exchanger 6 is suitable as a fuel.

Unfortunately certain control problems arise in heat exchanger 2. In particular, as the gaseous nitrogen rises through heat exchanger 2 its density increases very considerably. It will be appreciated that there is a nitrogen distribution manifold at either end of the heat exchanger 2 and in theory the gaseous nitrogen should rise uniformly through the conduits extending between the manifolds. Unfortunately, the pressure drop across the heat exchanger 2 is so low that occasionally a situation arises in which warm, low density gaseous nitrogen rises through some of the conduits extending between the manifolds and cold, high density nitrogen descends through others. This process upsets the temperature profile in the heat exchanger 2 and renders the process unstable.

As a possible solution to this problem it has been proposed to face the cold end of heat exchanger 2 downwardly. Whilst this solves the problem described above with respect to nitrogen another problem appears. In particular, the stream expanded through valve 15 is largely liquid. If this stream is introduced into the bottom of heat exchanger 2 slug flow results which again upsets the stability of the heat exchanger 2. This problem does not arise to any noticeable effect with two phase stream 11, presumably because of the relatively large ratio of gas to liquid present. It should also be noted that the problems described above with respect to nitrogen does not arise with the feed stream in view of the very high proportion of volatile hydrogen (96.73%).

Heretofore, we have solved this problem by mounting the heat exchanger 2 with its cold end uppermost and modifying the design of the conduits connecting the nitrogen distribution manifolds to prevent cold nitrogen returning to the warm end of the heat exchanger. This is however relatively expensive.

It is an object of at least preferred embodiments of the present invention to reduce this problem.

According to one aspect of the present invention there is provided an apparatus for manufacturing ammonia synthesis gas from a stream rich in hydrogen and a stream of nitrogen, which installation comprises a first heat exchanger for cooling said stream of nitrogen and said stream rich in hydrogen to a temperature which, when said nitrogen is at or above its critical pressure is between 8° C. and 28° C. above the critical temperature of said nitrogen, a second heat exchanger for cooling said stream rich in hydrogen leaving said first heat exchanger, means for introducing said stream rich in hydrogen leaving said second heat exchanger into the lower portion of a nitrogen wash column, a third heat exchanger for cooling part of said stream of nitrogen leaving said first heat exchanger to below its critical temperature, means for introducing the stream of nitrogen leaving said third heat exchanger into the top of said nitrogen wash column as reflux, means for dividing vapour consisting essentially of hydrogen and nitrogen from the top of said nitrogen wash column into two streams and conveying one of said streams through said second heat exchanger in countercurrent flow to said stream rich in hydrogen and the other of said streams through said third heat exchanger in countercurrent flow to said stream of nitrogen, means for combining said two streams leaving said second and third heat exchangers and the balance of said nitrogen leaving said first heat exchanger to form ammonia synthesis gas and means for conveying said ammonia synthesis gas through said first heat exchanger in countercurrent flow to said stream rich in hydrogen and said stream of nitrogen, means for expanding liquid (containing impurities washed out of said stream rich in hydrogen and nitrogen) leaving the bottom of said nitrogen wash column and passing the two phase mixture thus formed through said second heat exchanger wheren it vaporizes in countercurrent flow to said stream rich in hydrogen, and means for carrying the vapour through said first heat exchanger in countercurrent flow to said stream rich in hydrogen and said stream of nitrogen, said second heat exchanger being disposed with its cold end uppermost and said third heat exchanger being disposed with its warm end uppermost.

Preferably, said first heat exchanger is designed to cool said stream rich in hydrogen to between 11° C. and 22° C. above the critical temperature of said nitrogen and more preferably to 18° C. thereabove.

According to another aspect of the present invention there is provided an apparatus for manufacturing ammonia synthesis gas from a stream rich in hydrogen and a stream of nitrogen, which installation comprises a first heat exchanger for cooling said stream of nitrogen and said stream rich in hydrogen to a temperature which, when said nitrogen is below its critical pressure is between 3° C. and 9° C. above its dew point, a second heat exchanger for cooling said stream rich in hydrogen leaving said first heat exchanger, means for introducing said stream rich in hydrogen leaving said second heat exchanger into the lower portion of a nitrogen wash column, a third heat exchanger for cooling part of said stream of nitrogen leaving said first heat exchanger to below its dew point, means for introducing the stream of nitrogen leaving said third heat exchanger into the top of said nitrogen wash column as reflux, means for dividing vapour consisting essentially of hydrogen and nitrogen from the top of said nitrogen wash column into two streams and conveying one of said streams through said second heat exchanger in countercurrent flow to said stream rich in hydrogen and the other of said streams through said third heat exchanger in countercurrent flow to said stream of nitrogen, means for combining said two streams leaving said second and third heat exchangers and the balance of said nitrogen leaving said first heat exchanger to form ammonia synthesis gas and means for conveying said ammonia synthesis gas through said first heat exchanger in countercurrent flow to said stream rich in hydrogen and said stream of nitrogen, means for expanding liquid (containing impurities washed out of said stream rich in hydrogen and nitrogen) leaving the bottom of said nitrogen wash column and passing the two phase mixture thus formed through said second heat exchanger wherein it vaporises in countercurrent flow to said stream rich in hydrogen, and means for carrying the vapour through said first heat exchanger in countercurrent flow to said stream rich in hydrogen and said stream of nitrogen, said second heat exchanger being disposed with its cold end uppermost and said third heat exchanger being disposed with its warm end uppermost.

Preferably, the first heat exchanger is arranged with its cold end facing upwardly although this is not essential.

Preferably, said means for expanding said liquid leaving the bottom of said nitrogen wash column and passing the two phase mixture thus formed through said second heat exchanger comprises an expansion valve, a phase separator disposed downstream of said expansion valve, a first passageway for conveying vapour from said phase separator through said second heat exchanger, and a second passageway separate and distinct from said first passageway, for conveying liquid from said phase separator through said second heat exchanger; wherein said means for conveying the vapour from said second heat exchanger through said first heat exchanger comprises a third passageway communicating with said first passageway and a fourth passageway separate and distinct from said third passageway communicating with said second passageway, and wherein said apparatus also comprises a compressor which, in use, compresses gas rich in hydrogen from said third passageway and recycles it to said stream rich in hydrogen via means to cool said compressed gas.

The present invention also provides a method for manufacturing ammonia synthesis gas from a stream rich in hydrogen and a stream of nitrogen which method comprises the steps of:

(a) cooling said stream of nitrogen and said stream rich in hydrogen in a first heat exchanger to a temperature which, when said nitrogen leaving said first heat exchanger is at or above its critical pressure, is between 8° C. and 28° C. above its critical temperature;

(b) introducing said stream rich in hydrogen leaving said first heat exchanger into the bottom of a second heat exchanger and cooling said stream rich in hydrogen as it passes upwardly through said second heat exchanger;

(c) introducing said stream rich in hydrogen leaving said second heat exchanger into the lower portion of a nitrogen wash column;

(d) cooling part of said stream of nitrogen leaving said first heat exchanger to below its critical temperature in a third heat exchanger arranged with its warm end uppermost;

(e) introducing said stream of nitrogen leaving said third heat exchanger into the top of said nitrogen wash column to act as reflux;

(f) dividing the vapour consisting essentially of hydrogen and nitrogen from the top of said nitrogen wash column into two streams;

(g) passing one of said streams through said second heat exchanger in countercurrent flow to said stream rich in hydrogen;

(h) passing the other of said streams through said third heat exchanger in countercurrent flow to said stream of nitrogen;

(i) combining said one and said other streams leaving said second and third heat exchangers respectively and the balance of said stream of nitrogen leaving said first heat exchanger to form ammonia synthesis gas;

(j) passing said ammonia synthesis gas through said first heat exchanger in countercurrent flow to said stream rich in hydrogen and said stream of nitrogen;

(k) expanding liquid (containing impurities washed out of said stream rich in hydrogen and nitrogen) leaving the bottom of said nitrogen wash column and passing the two phase mixture thus forward through said second heat exchanger wherein it vaporises in countercurrent flow to said stream rich in hydrogen and passing said vapour through said first heat exchanger in countercurrent flow to said stream rich in hydrogen and said stream of nitrogen.

The present invention further provides a method of manufacturing ammonia synthesis gas from a stream rich in hydrogen and a stream of nitrogen which method comprises the steps of:

(a) cooling said stream of nitrogen and said stream rich in hydrogen in a first heat exchanger to a temperature which, when said nitrogen leaving said first heat exchanger is below its critical pressure is between 3° C. and 9° C. above its dew point;

(b) introducing said stream rich in hydrogen leaving said first heat exchanger into the bottom of a second heat exchanger and cooling said stream rich in hydrogen as it passes upwardly through said second heat exchanger;

(c) introducing said stream rich in hydrogen leaving said second heat exchanger into the lower portion of a nitrogen wash column;

(d) cooling part of said stream of nitrogen leaving said first heat exchanger to below its critical temperature in a third heat exchanger arranged with its warm end uppermost;

(e) introducing said stream of nitrogen leaving said third heat exchanger into the top of said nitrogen wash column to act as reflux;

(f) dividing the vapour consisting essentially of hydrogen and nitrogen from the top of said nitrogen wash column into two streams;

(g) passing one of said streams through said second heat exchanger in countercurrent flow to said stream rich in hydrogen;

(h) passing the other of said streams through said third heat exchanger in countercurrent flow to said stream of nitrogen;

(i) combining said one and said other streams leaving said second and third heat exchangers respectively and the balance of said stream of nitrogen leaving said first heat exchanger to form ammonia synthesis gas;

(j) passing said ammonia synthesis gas through said first heat exchanger in countercurrent flow to said stream rich in hydrogen and said stream of nitrogen;

(k) expanding liquid (containing impurities washed out of said stream rich in hydrogen and nitrogen) leaving the bottom of said nitrogen wash column and passing the two phase mixture thus forward through said second heat exchanger wherein it vaporises in countercurrent flow to said stream rich in hydrogen and passing said vapour through said first heat exchanger in countercurrent flow to said stream rich in hydrogen and said stream of nitrogen.

Preferably, in step (k) said liquid is expanded and the resulting two phase mixture comprising a liquid phase and a gaseous phase rich in hydrogen is introduced into a phase separator, said liquid phase and said gaseous phase rich in hydrogen are passed through separate and distinct passageways in said second heat exchanger and said first heat exchanger, and said gaseous phase rich in hydrogen leaving said first heat exchanger is compressed, cooled and returned, directly or indirectly, to said stream rich in hydrogen.

For a better understanding of the invention reference will now be made to FIG. 2 of the accompanying drawings which is a flowsheet of one embodiment of an apparatus in accordance with the invention.

Referring to FIG. 2, a feed stream 101 comprising (by volume):
$H_2$: 96.73%
CO: 2.57
$CH_4$: 0.3
A: 0.27
Others: 0.13
at $-55°$ C. and 48.5 $Kg/cm^2$ absolute is cooled to $-129°$ C. in heat exchanger 102. The stream is then further cooled to $-187°$ C. in heat exchanger 202. The stream leaving the heat exchanger 202 is just above its dew point and is fed through a pipe 103 into a nitrogen wash column 104.

A stream 105 of gaseous nitrogen at 49.7 $Kg/cm_2$ absolute is cooled to $-55°$ C. in heat exchanger 106 and to $-129°$ C. in heat exchanger 102. The nitrogen leaving heat exchanger 102 is 18° C. above the critical temperature of nitrogen at 49.7 $Kg/cm^2$ absolute and hence the difference in density of nitrogen between the bottom and top of heat exchanger 102 is sufficiently small to minimise the problem described with reference to FIG. 1. Approximately one third of the nitrogen leaving heat exchanger 102 is taken through conduit 203 to the top of heat exchanger 204 wherein the nitrogen is cooled to $-187°$ C. at which temperature it is supercritical. The density of the nitrogen increases rapidly as it descends through heat exchanger 204 but this causes no serious control problems as the nitrogen is passing downwardly. The supercritical nitrogen leaving heat exchanger 204 is expanded to 47.7 $Kg/cm^2$ absolute through valve 108 and enters the top of nitrogen wash column 104 where it changes to an almost entirely liquid stream.

As the liquid nitrogen passes down the nitrogen wash column 104 it condenses the carbon monoxide, methane and argon which collect in the bottom of the nitrogen wash column together with some nitrogen. The hydrogen, together with most of the nitrogen in the form of vapour leaves the top of the nitrogen wash column 104 through pipe 110. At this stage the stream is divided into two streams. Approximately one third of the stream is passed through heat exchanger 104 via pipe 205 whilst the balance is passed through heat exchanger 202 via pipe 206. The two streams are recombined at point 207 and are then mixed with nitrogen expanded to 47.5 $Kg/cm^2$ absolute through valve 109. The combined mixture which is at a temperature of $-138°$ C., is warmed in heat exchanger 102 which it leaves at $-58°$ C. The mixture is then divided into two streams 112 and 113. Approximately 75% of the mixture passes along stream 112 whilst the balance is warmed against the incoming gaseous nitrogen in heat exchanger 106.

The liquid leaves the bottom of the nitrogen wash column 104 through pipe 114 and is expanded to 4.6 $Kg/cm^2$ absolute at valve 115. A small quantity of liquid nitrogen from conduit 116 is added to the mixture leaving valve 115 and the mixture is introduced into heat exchanger 202 (via a two phase separator and two phase distributor—not shown) which it leaves at $-133°$ C. As the two phases are vaporising downwardly there are no appreciable control problems. The vaporised mixture is then passed through heat exchangers 102 and 106 before being passed to a fuel store.

Our calculations indicate that the energy consumption of the installation shown in FIG. 2 is approximately the same as in FIG. 1. In terms of installation costs, our initial evaluation indicates that the installation shown in FIG. 2 is 0.2% less expensive than that shown in FIG. 1. In particular, the cost of the extra heat exchangers and this associated pipework is offset by the savings created by omitting the two phase distributors associated with stream 11 in heat exchanger 2 and their ancillary supply equipment (which is not detailed in FIG. 1).

Various modifications to the apparatus shown in FIG. 2 are envisaged. Thus, whilst the warm end of heat exchanger 204 and the cold end of heat exchanger 202 necessarily face upwardly, heat exchanger 102 and heat exchanger 106 may have either its cold end or its warm end facing upwardly. Whilst FIG. 2 shws liquid nitrogen being added to the stream being expanded through valve 115 it should be understood that an indirect heat exchanger could also be used. Alternatively, if the pressure of the feed 1 is sufficiently high (greater than 77 $Kg/cm^2$ absolute) the supply of liquid nitrogen can be dispensed with altogether.

In general the apparatus described will be operated with the nitrogen immediately up stream of the nitrogen wash column being above its critical pressure, i.e. 34.7 Kg/cm² absolute (493 psia). However, we have found the process described with reference to FIG. 2 can be operated with the nitrogen immediately upstream of the nitrogen wash column being below its critical pressure. However, in such a case the temperature of the gaseous nitrogen leaving heat exchanger 102 must be between 3° C. and 9° C. above its dew point.

It will be appreciated that whereas the majority of hydrogen leaves the nitrogen wash column 104 through pipe 110 a small proportion (about 0.5% by volume of the hydrogen in the feed stream 101) leaves the nitrogen wash column 104 through pipe 114. After expansion at valve 115 the majority of the hydrogen (about 96.5% by volume) enters the vapour phase. Instead of introducing these phases into heat exchanger 202 via the usual phase separator and two phase distributor, we have found that after expansion at valve 115 the two phase mixture, with or without the addition of liquid nitrogen from conduit 116, should be separated and the resulting liquid phase and hydrogen rich gaseous phase passed through separate and distinct passageways in heat exchanger 202. The gaseous phases leaving heat exchanger 202 should then be passed through separate and distinct passageways in heat exchanger 102 and preferably heat exchanger 106, the hydrogen rich gaseous phase leaving heat exchanger 106 (or 102) being compressed, cooled and recycled to feed stream 101. In this connection refrigeration for cooling the compressed hydrogen rich gas may be obtained either by passing the compressed hydrogen rich gas through heat exchanger 106 or by an external refrigerator. Thus, if the apparatus of the present invention is downstream of a low temperature acid gas removal unit, for example a Rectisol unit, the compressed hydrogen rich gas can conveniently be recycled to the input of such unit. This modification ensures that approximately 99.98% of the hydrogen entering the apparatus is recovered. Our initial calculations indicate that the value of the additional hydrogen recovered will pay for the added capital expenditure in about 6 months of normal operation.

What is claimed is:

1. A method for manufacturing ammonia synthesis gas from a stream rich in hydrogen and a stream of nitrogen which method comprises the steps of:
   (a) cooling said stream of nitrogen and said stream rich in hydrogen in a first heat exchanger to a temperature which, when said nitrogen leaving said first heat exchanger is at or above its critical pressure, is between 8° C. and 28° C. above its critical temperature;
   (b) introducing said stream rich in hydrogen leaving said first heat exchanger into the bottom of a second heat exchanger and cooling said stream rich in hydrogen as it passes upwardly through said second heat exchanger;
   (c) introducing said stream rich in hydrogen leaving said second heat exchanger into the lower portion of a nitrogen wash column;
   (d) cooling part of said stream of nitrogen leaving said first heat exchanger to below its critical termperature in a third heat exchanger arranged with its warm end uppermost;
   (e) introducing said stream of nitrogen leaving said third heat exchanger into the top of said nitrogen wash column to act as reflux;
   (f) dividing the vapour consisting essentially of hydrogen and nitrogen from the top of said nitrogen wash column into two streams;
   (g) passing one of said streams through said second heat exchanger in countercurrent flow to said stream rich in hydrogen;
   (h) passing the other of said streams through said third heat exchanger in countercurrent flow to said stream of nitrogen;
   (i) combining said one and said other streams leaving said second and third heat exchangers respectively and the balance of said stream of nitrogen leaving said first heat exchanger to form ammonia synthesis gas;
   (j) passing said ammonia synthesis gas through said first heat exchanger in countercurrent flow to said stream rich in hydrogen and said stream of nitrogen;
   (k) expanding liquid (containing impurities washed out of said stream rich in hydrogen and nitrogen) leaving the bottom of said nitrogen wash column and passing the two phase mixture thus forward through said second heat exchanger wherein it vaporises in countercurrent flow to said stream rich in hydrogen and passing said vapour through said first heat exchanger in countercurrent flow to said stream rich in hydrogen and said stream of nitrogen.

2. A method of manufacturing ammonia synthesis gas from a stream of rich in hydrogen and a stream of nitrogen which method comprises the steps of:
   (a) cooling said stream of nitrogen and said stream rich in hydrogen in a first heat exchanger to a temperature which, when said nitrogen leaving said first heat exchanger is below its critical pressure is between 3° C. and 9° C. above its dew point;
   (b) introducing said stream rich in hydrogen leaving said first heat exchanger into the bottom of a second heat exchanger and cooling said stream rich in hydrogen as it passes upwardly through said second heat exchanger;
   (c) introducing said stream rich in hydrogen leaving said second heat exchanger into the lower portion of a nitrogen wash column;
   (d) cooling part of said stream of nitrogen leaving said first heat exchanger to below its critical temperature in a third heat exchanger arranged with its warm end uppermost;
   (e) introducing said stream of nitrogen leaving said third heat exchanger into the top of said nitrogen wash column to act as reflux;
   (f) dividing the vapour consisting essentially of hydrogen and nitrogen from the top of said nitrogen wash column into two streams;
   (g) passing one of said streams through said second heat exchanger in countercurrent flow to said stream rich in hydrogen;
   (h) passing the other of said streams through said third heat exchanger in countercurrent flow to said stream of nitrogen;
   (i) combining said one and said other streams leaving said second and third heat exchangers respectively and the balance of said stream of nitrogen leaving said first heat exchanger to form ammonia synthesis gas;
   (j) passing said ammonia synthesis gas through said first heat exchanger in countercurrent flow to said stream rich in hydrogen and said stream of nitrogen;

(k) expanding liquid (containing impurities washed out of said stream rich in hydrogen and nitrogen) leaving the bottom of said nitrogen wash column and passing the two phase mixture thus forward through said second heat exchanger wherein it vaporises in countercurrent flow to said stream rich in hydrogen and passing said vapour through said first heat exchanger in countercurrent flow to said stream rich in hydrogen and said stream of nitrogen.

3. A method according to claim 1, wherein in step (k) said liquid is expanded and the resulting two phase mixture comprising a liquid phase and a gaseous phase rich in hydrogen is introduced into a phase separator, said liquid phase and said gaseous phase rich in hydrogen are passed through separate and distinct passageways in said second heat exchanger and said first heat exchanger, and said gaseous phase rich in hydrogen leaving said first heat exchanger is compressed, cooled and returned, directly or indirectly to said stream rich in hydrogen.

4. A method according to claim 2, wherein in step (k) said liquid is expanded and the resulting two phase mixture comprising a liquid phase and a gaseous phase rich in hydrogen is introduced into a phase separator, said liquid phase and said gaseous phase rich in hydrogen are passed through separate and distinct passageways in said second heat exchanger and said first heat exchanger, and said gaseous phase rich in hydrogen leaving said first heat exchanger is compressed, cooled and returned, directly or indirectly to said stream rich in hydrogen.

* * * * *